United States Patent
Belson et al.

(10) Patent No.: US 7,590,872 B2
(45) Date of Patent: Sep. 15, 2009

(54) HOT SWAPPABLE POWER SUPPLY DEVICE AND METHOD OF OPERATION

(75) Inventors: Steven A. Belson, Plano, TX (US); Eric Peterson, McKinney, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 729 days.

(21) Appl. No.: 10/944,123

(22) Filed: Sep. 17, 2004

(65) Prior Publication Data

US 2006/0061976 A1  Mar. 23, 2006

(51) Int. Cl.
*G06F 1/00* (2006.01)
*G06F 1/26* (2006.01)
*G06F 11/30* (2006.01)

(52) U.S. Cl. .................... 713/300; 713/320; 713/340; 361/139; 710/100; 710/304

(58) Field of Classification Search ................. 713/300, 713/310, 320, 321, 340; 361/139; 710/100, 710/304
See application file for complete search history.

(56) References Cited

U.S. PATENT DOCUMENTS

| | | | |
|---|---|---|---|
| 4,797,899 A * | 1/1989 | Fuller et al. .................. 375/219 |
| 5,726,506 A * | 3/1998 | Wood .......................... 307/147 |
| 6,026,458 A | 2/2000 | Rasums | |
| 6,044,424 A | 3/2000 | Amin | |
| 6,138,182 A * | 10/2000 | Hennessy et al. ............. 710/16 |
| 6,153,947 A | 11/2000 | Rockow | |
| 6,259,171 B1 | 7/2001 | Cheng | |
| 6,653,748 B2 * | 11/2003 | Buchanan .................... 307/51 |
| 6,661,564 B2 * | 12/2003 | Tsujimura et al. ........... 359/296 |
| 2003/0043561 A1* | 3/2003 | Brooks ........................ 361/796 |
| 2003/0067223 A1* | 4/2003 | Buchanan .................... 307/51 |
| 2003/0222618 A1* | 12/2003 | Kanouda et al. ............ 320/116 |
| 2005/0003266 A1* | 1/2005 | Wulff .......................... 429/97 |

\* cited by examiner

*Primary Examiner*—Thomas Lee
*Assistant Examiner*—Michael J Brown

(57) ABSTRACT

In one embodiment, a hot swappable power supply device comprises power supply circuitry for receiving input power at a first voltage and for providing output power to a voltage bus at a second voltage, a latch element that selectively mechanically couples the power supply device to an external frame structure, and a control circuit, wherein the control circuit responds to a power down signal by powering down the power supply circuitry and releasing mechanical coupling to the external frame structure by the latch element after energy has been substantially dissipated from the power supply circuitry.

17 Claims, 2 Drawing Sheets

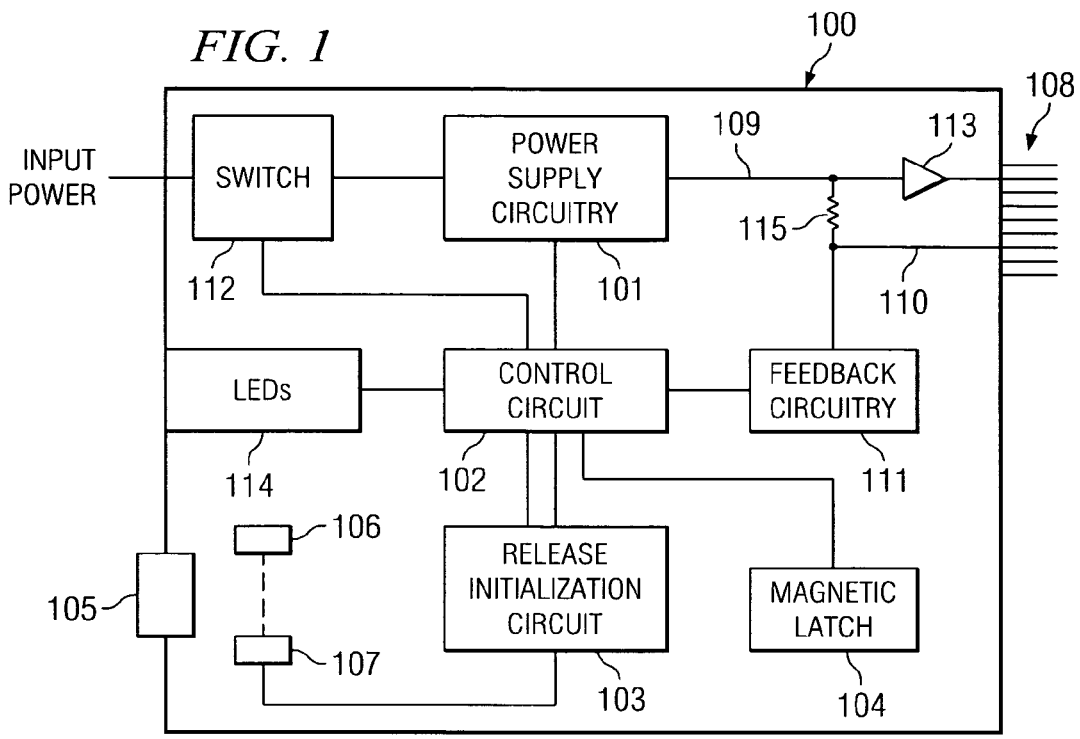
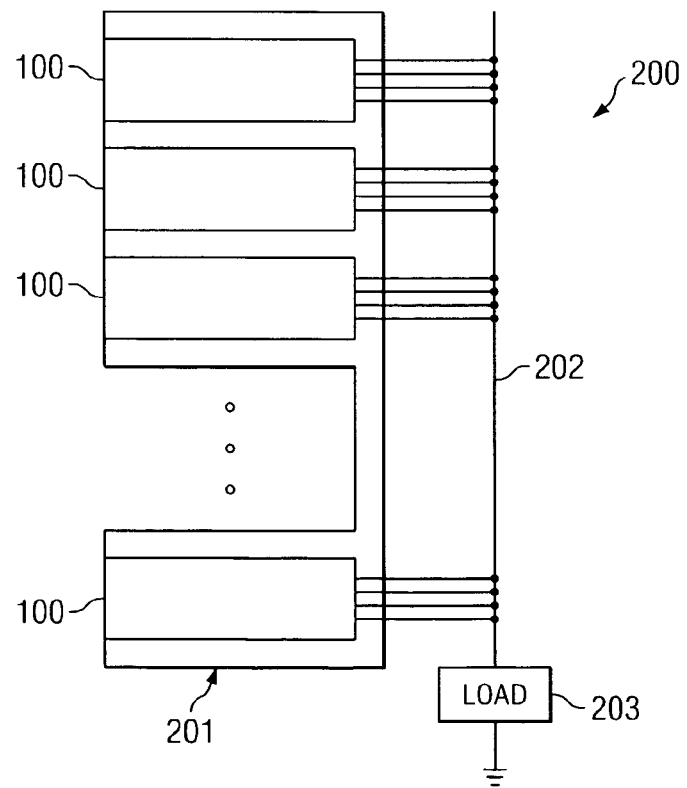

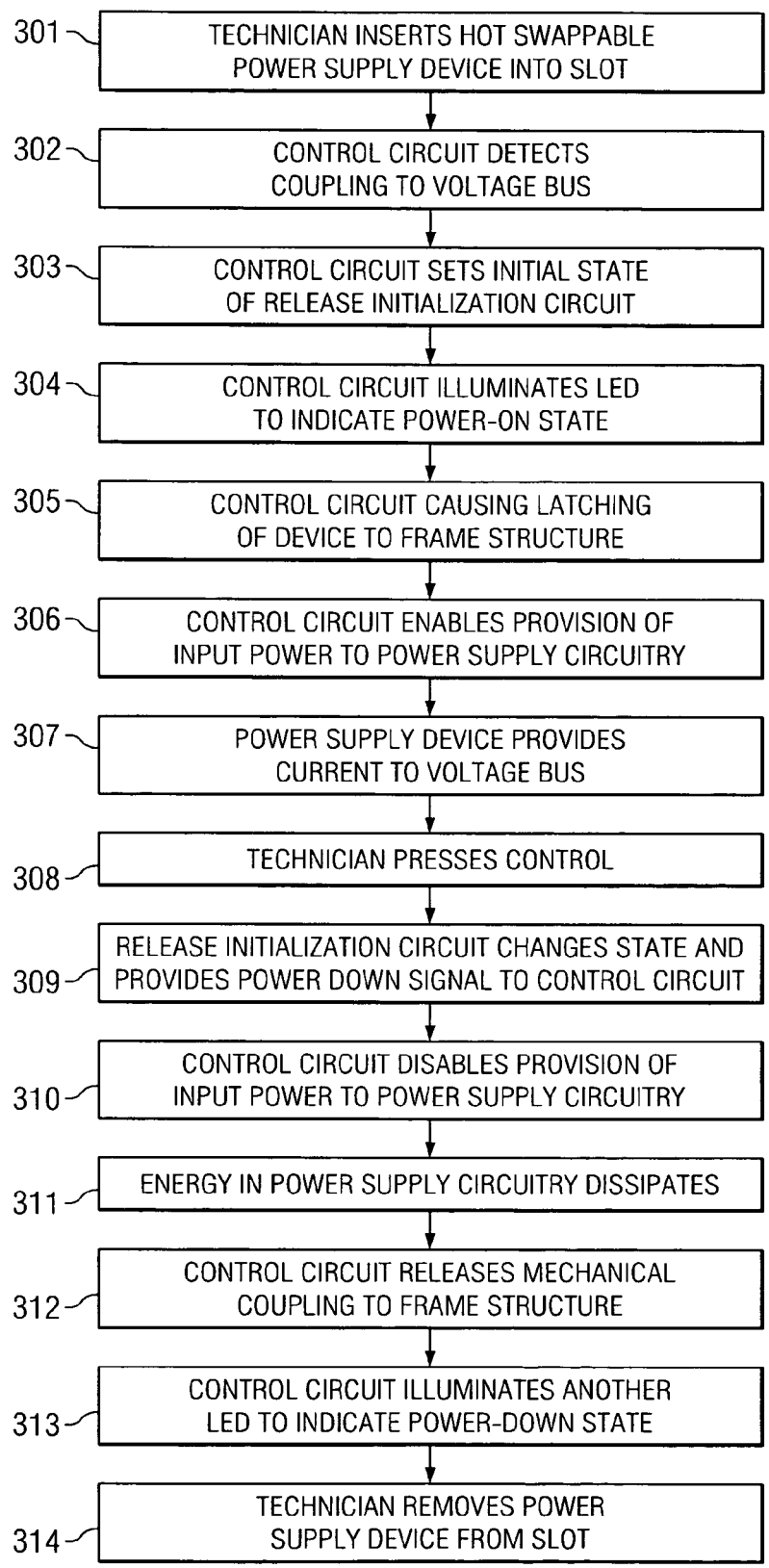

HOT SWAPPABLE POWER SUPPLY DEVICE AND METHOD OF OPERATION

BACKGROUND

Large electronic systems (such as telecommunication systems and relatively large computer server platforms) typically possess relatively high current requirements. In large electronic systems, "brick" converters are frequently employed to meet these requirements. Brick converters refer to printed circuit board devices that perform power distribution functions. Brick converters generally convert an input high voltage supply into a lower voltage supply for power distribution within the electronic equipment at current levels appropriate for the electronic equipment. Brick converters may also provide power isolation, power regulation, filtering, and input protection functionality.

Multiple brick converters can be coupled in parallel to a common node voltage bus. The common node voltage bus distributes power to electronic equipment or portions thereof. Typically, a respective blocking or isolation diode is disposed between each brick converter and the voltage bus. Also, a voltage sense bus is coupled to the common node voltage bus to provide feedback to the brick converters. When feedback indicates that the voltage on the common node voltage bus is high, the respective brick converters respond by reducing their energy output, i.e., reducing their duty cycle. When feedback indicates that the voltage on the common node voltage bus is low, the respective brick converters respond by increasing their energy output. By coupling a plurality of brick converters in this manner, the aggregate power supply may be divided between the respective brick converters.

By dividing the load among the brick converters, redundant power supply architectures may be implemented. In a redundant power supply architecture, at least one extra brick converter is coupled to a voltage bus than is believed to be necessary for expected loads. Thus, if one of the brick converter fails and can no longer supply current, the remaining brick converters are capable of satisfying the load requirements. Additionally, the redundant power supply architecture may be implemented to permit "hot swapping" of brick converters. Hot swapping refers to removal of a brick converter from the voltage bus while the supported system continues operations. By implementing a power supply architecture in this manner, a failing brick converter will not require a system to be taken offline to remedy the failing converter.

SUMMARY

In one embodiment, a hot swappable power supply device comprises power supply circuitry for receiving input power at a first voltage and for providing output power to a voltage bus at a second voltage, a latch element that selectively mechanically couples the power supply device to an external frame structure, and a control circuit, wherein the control circuit responds to a power down signal by powering down the power supply circuitry and releasing mechanical coupling to the external frame structure by the latch element after energy has been substantially dissipated from the power supply circuitry.

In another embodiment, a method of operating a hot swappable power supply device for a redundant power supply system comprises generating a signal indicating the power supply device is to be removed from an external frame structure, powering down power supply circuitry of the power supply device in response to the generated signal, and releasing a mechanical latch coupling the power supply device to an external frame structure after energy has been substantially dissipated from the power supply circuitry.

In another embodiment, a power supply system for electronic equipment comprises a voltage bus for distributing power to the electronic equipment, a plurality of brick converters that each engage the voltage bus in a hot swappable manner and that maintain the voltage bus at a second voltage, a frame structure for receiving the plurality of brick converters, wherein each of the plurality of brick converter comprises: power supply circuitry for receiving input power at a first voltage to supply current to the voltage bus, a circuit element for generating a power down signal in response to input from a user, a latch element that controllably mechanically couples to the frame structure, and a control circuit that responds to the power down signal by disabling input power to the power supply circuitry and by controlling the latch element to release mechanical coupling to the frame structure after energy is substantially dissipated from the power supply circuitry.

BRIEF DESCRIPTION OF THE DRAWINGS

FIG. 1 depicts a hot swappable power supply device according to one representative embodiment.

FIG. 2 depicts a power supply system having multiple hot swappable power supply devices according to one representative embodiment.

FIG. 3 depicts a flowchart for operating a power supply device according to one representative embodiment.

DETAILED DESCRIPTION

Referring now to the drawings, FIG. 1 depicts power supply device 100 according to one representative embodiment. Power supply device 100 is implemented to supply current to a voltage bus (not shown) to maintain the voltage bus at a desired voltage. Power supply device 100 may be packaged according to a brick converter design if desired. Power supply device 100 may provide power isolation, power regulation, filtering, and input protection functionality. Within power supply device 100, power supply circuitry 101 includes various capacitive and filtering circuits for these functions. Because of the inclusion of these circuits, energy is stored in power supply circuitry 100 from some amount of time after the input power ceases. If the energy stored in power supply circuitry 101 is not dissipated before pins 108 are disengaged from the voltage bus, a number of negative consequences may occur. First, electrical arcing may occur between pins 108 and the voltage bus. Potentially, power supply device 100 can be damaged Secondly, pulses of voltage and current may be experienced on the voltage bus potentially leading to system failure, derailed circuits, missed or incorrectly read data, and/or the like.

In general, "short-pin" designs may be employed to dissipate energy in power supply circuitry 100 before pins 108 are disengaged from the voltage bus. Specifically, a short pin is used to generate a power down signal. When a brick converter is removed from the voltage bus interconnect, the short pin is disengaged before the pins that supply the current to the voltage bus. During the interim between the removal of the short pin and the other pins, the energy in power supply circuitry 100 is dissipated. However, if a field technician removes a brick converter having a short pin design too quickly, a substantial amount of energy may remain in power supply circuitry 100 thereby leading to the discussed consequences. Furthermore, pin "bouncing" may occur. That is, the short pin may repeatedly connect and disconnect ("bounce")

during brick converter removal. The pin bouncing may cause the brick converter to engage and disengage repeatedly thereby leading to voltage and current pulses.

Some representative embodiments employ control circuit 102, release initialization circuit 103, and magnetic latch 104 to ensure that substantially all of the energy in power supply circuitry 101 is dissipated before power supply device 100 is disengaged from a voltage bus. In one embodiment, magnetic latch 104 receives power while input power is provided to power supply circuitry 101. Magnetic latch 104 generates a magnetic field. The magnetic field mechanically couples power supply device 100 to a frame of the power supply system. Accordingly, a field technician is prevented from easily disengaging power supply device 100 from the voltage bus until control circuit 102 determines that substantially all of the energy in power supply circuitry 101 is dissipated. Although any suitable mechanical latching mechanism may be employed, a magnetic latch is expedient because it enables the housing of power supply device 100 to be implemented in an efficient modular manner. Specifically, exterior latching structures can be avoided.

In one embodiment, when a user wishes to disengage power supply device 100 from the interconnect with the voltage bus, the user may first push or otherwise manually manipulate mechanical control 105. Mechanical control 105 is thereby caused to interrupt the optical path between emitter 106 and optical receiver 107. Release initialization circuit 103 is communicatively coupled to optical receiver 107 and responds to the interruption of the optical path by changing its state. Specifically, release initialization circuit 103 begins to communicate a signal to control circuit 102 that power should not be provided to power supply circuitry 101. In one embodiment, release initialization circuit 103 is implemented so that it remains in the respective state thereby continuing communication of the signal to control circuit 102 even after the optical path between emitter 106 and receiver 107 is reestablished thereby avoiding "bouncing." Release initialization circuit 103 may be set to the operational state by control circuit 102 during initial power-up operations. Although an optical arrangement is shown in FIG. 1, any other suitable circuitry or mechanisms may be employed to enable a user to initiate the power down operations.

When control circuit 102 receives a signal from release initialization circuit 103 that is indicative that the user wishes to remove power supply device 100, control circuit 102 may control switch 112 to cease providing the input power to power supply circuitry 101. While energy remains within power supply circuitry 101, some amount of current flows through output line 109, blocking diode 113, pins 108 to the voltage bus. The flow of current dissipates the energy within power supply circuitry 101. Also, while the energy is being dissipated, control circuit 102 may activate one of light emitting diodes (LEDs) 114 to indicate that power supply device 100 is being powered down. In one representative embodiment, power supply circuitry 101 provides a signal to control circuit 102 that is indicative of the amount of energy remaining. When substantially all of the energy has been dissipated as determined by the signal from power supply circuitry 101, control circuit 102 releases the mechanical coupling associated with magnetic latch 104. Substantially all of the energy means that sufficient energy has been dissipated so that device 100 will not be damaged and the supported electronic equipment will not experience errors upon removal. Alternatively, control circuit 102 may employ a timing mechanism to determine whether substantially all of the energy has been dissipated. Control circuit 102 may activate another one of LEDs 114 to indicate that power supply device 100 is ready to be disengaged. The user may then remove power supply device 100 without risking damage to device 100 or the occurrence of pulses on the voltage bus.

In one representative embodiment, control circuit 102 may also respond to signals indicating that power supply device 100 is operating improperly. For example, power supply device 100 may comprise protective resistor 115 between output line 109 and feedback line 110. Feedback circuitry 111 detects when the output voltage from output line is excessive using this arrangement. Feedback circuitry 111 communicates a suitable signal to control circuit 102. Control circuit 102 may response by ceasing provision of input power to power supply circuitry 101. The cessation of input power may be temporary if the excessive output voltage is merely a transient occurrence. Alternatively, if repeated occurrences are detected, control circuit 102 may power down power supply device 100. Control circuit 102 may cease provision of input power to power supply circuitry 101, dissipate the energy in power supply circuitry 101, release latch 104, and indicate the power-down state using one of LEDs 114. Control circuit 102 may similarly response to signals from external circuits (not shown) that indicate that device 100 is operating improperly.

FIG. 2 depicts a redundant power supply system 200 with hot swappable power supply devices 100 according to one representative embodiment. System 200 includes frame structure 201. Frame structure 201 physically receives power supply devices 100. Frame structure 200 may be implemented using a suitable cabinet structure or the like. Furthermore, frame structure 200 is adapted to facilitate the selective mechanical coupling via latch 104. Power supply devices 100 are coupled to voltage bus 202. Voltage bus 202 is used to distribute power to the electronic and other components associated with load 203. At least one additional power supply device 100 may be provided than necessary to meet the requirements associated with load 203. If one of power supply devices 100 begins to operate improperly, a warning signal may be generated. A field technician may remove and replace the problematic power supply device 100 without ceasing the operations of the system. Also, because power supply devices 100 ensure that substantially all energy is dissipated before their removal, removal of the failing device 100 will not cause damage to the device 100 or interfere with the operations of the electronic and other equipment associated with load 203.

FIG. 3 depicts a flowchart for operating a hot swappable power supply device according to one representative embodiment. In step 301, hot swappable device 100 is inserted into a slot of a power supply system by a field technician. In step 302, control circuit 102 detects that device 100 is coupled to voltage bus 202. Control circuit 102 sets release initialization circuit 103 to an initial state in which release initialization circuit 103 does not communicate a power down signal to control circuit 102 (step 303). Control circuit 102 illuminates one of LEDs 114 to indicate the power-on state. (step 304). In step 305, control circuit 102 controls latch 104 to mechanically couple device 100 to frame structure 201. Control circuit 102 sets switch 112 to provide input power to power supply circuitry 101 (step 306) and device 100 begins to provide current to voltage bus 202 (step 307).

In step 308, a field technician may begin operations to disengage device 100 from voltage bus 202 by manipulating control 105 (e.g., pressing a button). In step 309, release initialization circuit 103 changes its state in response to the input from user and communicates a power down signal to control circuit 102. Control circuit 102 responds to the power down signal by disabling provision of input power to power supply circuitry 101 using switch 112 (step 310). The energy stored in power supply circuitry 101 dissipates (step 311). After substantially all of the energy is dissipated, control circuit 102 releases the mechanical coupling associated with latch 104 (step 312). Control circuit 313 illuminates another LED of LEDs 114 to indicate the power-down state (step 313). The field technician then removes power supply device 100 from its slot (step 314).

Some representative embodiments enable efficient operations of a power supply system. Some representative embodiments ensure that substantially all energy stored in a power supply device, such as a brick converter, is dissipated before the device is removed from the power supply system. Thereby, the supported electronics will not malfunction and the power supply device is prevented from being damaged. Additionally, the dissipation of energy from the power supply devices is not dependent the performance of field technicians.

What is claimed is:

1. A hot swappable power supply device, comprising:
   power supply circuitry for receiving input power at a first voltage and for providing output power to a voltage bus at a second voltage;
   a latch element that selectively mechanically couples said power supply device to an external frame structure; and
   a control circuit, wherein said control circuit responds to a power down signal by powering down said power supply circuitry and releasing mechanical coupling to said external frame structure by said latch element after energy has been substantially dissipated from said power supply circuitry;
   wherein a circuit element is activated by an optical receiver to generate said power down signal.

2. The hot swappable power supply device of claim 1 further comprising:
   a mechanical control for receiving said input from a user, wherein said mechanical control modifies an optical path associated with said optical receiver.

3. The hot swappable power supply device of claim 1 wherein said latch element couples said power supply device to said frame structure by generating a magnetic field.

4. The hot swappable power supply device of claim 1 wherein said power supply circuitry provides a signal to said control circuit that is indicative of an amount of energy stored in said power supply circuitry.

5. The hot swappable power supply device of claim 1 comprising:
   a light emitter indicating whether said power supply circuitry is powered down.

6. The hot swappable power supply device of claim 1 wherein said control circuit is further operable to power down said power supply circuitry and release said mechanical coupling in response to a signal indicating that said power supply device is operating improperly.

7. The hot swappable power supply device of claim 1 wherein said control circuit employs a timing mechanism to control releasing of said latch element.

8. A method of operating a hot swappable power supply device for a redundant power supply system, comprising:
   generating a signal indicating said power supply device is to be removed from an external frame structure;
   powering down power supply circuitry of said power supply device in response to said generated signal; and
   releasing a mechanical latch coupling said power supply device to said external frame structure after energy has been substantially dissipated from said power supply circuitry;
   wherein said mechanical latch generates a magnetic field to mechanically couple said power supply device to said power supply system.

9. The method of claim 8 wherein a circuit element performs said generating when a user manipulates a mechanical control operatively coupled to said circuit element.

10. The method of claim 9 wherein said circuit element remains activated after said mechanical control returns to an initial state.

11. The method of claim 8 further comprising:
    providing said user with a signal that said power supply device is ready to be removed from said power supply system.

12. The method of claim 8 further comprising:
    providing a signal by said power supply circuitry that is indicative of an amount of energy stored in said power supply circuitry to control said releasing.

13. A power supply system for electronic equipment, comprising:
    a voltage bus for distributing power to said electronic equipment;
    a plurality of brick converters that each engage said voltage bus in a hot swappable manner and that maintain said voltage bus at a second voltage;
    a frame structure for receiving said plurality of brick converters;
       wherein each of said plurality of brick converter comprises:
    power supply circuitry for receiving input power at a first voltage to supply current to said voltage bus;
    a circuit element for generating a power down signal in response to input from a user;
    a latch element that controllably mechanically couples to said frame structure; and
    a control circuit that responds to said power down signal by disabling input power to said power supply circuitry and by controlling said latch element to release mechanical coupling to said frame structure after energy is substantially dissipated from said power supply circuitry;
    wherein said circuit element is activated when a mechanical control that receives said input from said user modifies an optical path associated with an optical receiver coupled to said circuit element.

14. The power supply system of claim 13 wherein said circuit element remains in an activated state after initial activation by said input from said user.

15. The power supply system of claim 14 wherein said control circuit sets said circuit element to a nonactivated state when its brick converter is powered on.

16. The power supply system of claim 13 wherein said control circuit is further operable to power down said power supply circuitry and release said mechanical coupling in response to a signal indicating that its respective brick converter is operating improperly.

17. The power supply system of claim 13 wherein said control circuit controls said latch element after disabling input power to said power supply circuitry using a timing mechanism.

* * * * *